Oct. 25, 1949. D. ZACCAGNINO Re. 23,162
MUSICAL INSTRUMENT
Original Filed Aug. 11, 1943
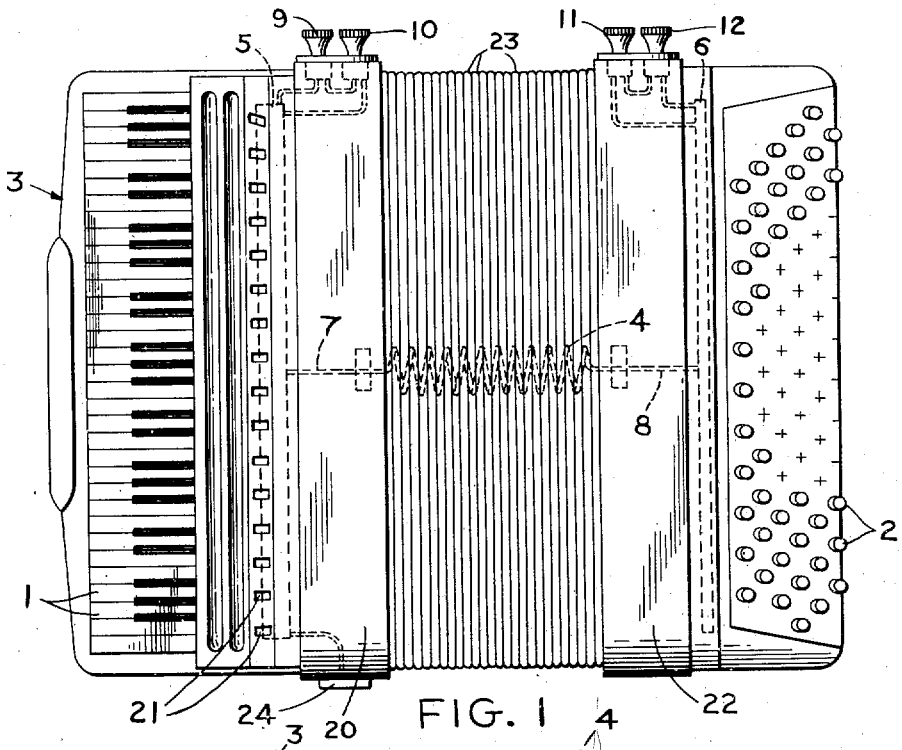
FIG. 1
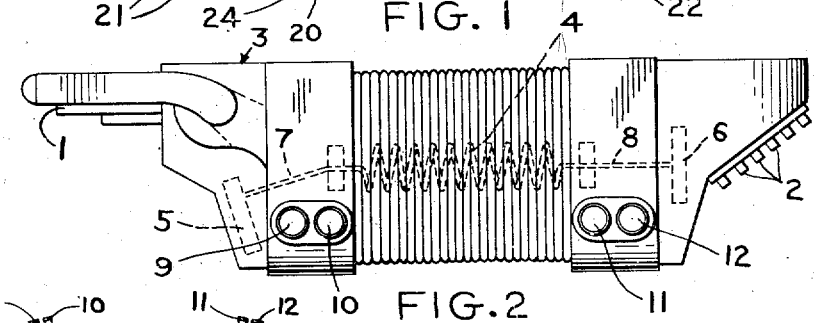
FIG. 2
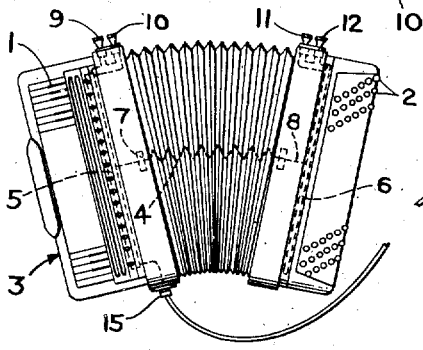
FIG. 3
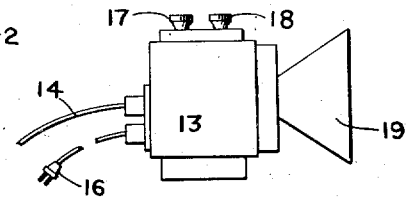
DOMINICK ZACCAGNINO
INVENTOR.
BY Robert Meyer
Attorney Reissued Oct. 25, 1949

Re. 23,162

UNITED STATES PATENT OFFICE 23,162

MUSICAL INSTRUMENT

Dominick Zaccagnino, Newark, N. J.

Original No. 2,356,368, dated August 22, 1944, Serial No. 498,165, August 11, 1943. Application for reissue August 7, 1946, Serial No. 688,832

3 Claims. (Cl. 84—1.04)

This invention relates to musical instruments and refers particularly to an amplifying system for accordions.

Accordions are comparatively heavy instruments which are supported by straps from the shoulders of the players, and which require considerable physical force for their manipulation. It was found that players lacking such physical force became easily exhausted when playing the instrument, or were obliged to play light instruments having a comparatively poor tone.

An object of the present invention is the provision of an amplifying system for accordions which makes it possible for the player or his assistant to vary at will the volume and tone of the sounds emanating from the accordion.

Another object is the provision of an accordion having an amplifying system by means of which the tone and volume of sounds of the accordion can be quickly and easily varied.

A further object is to provide comparatively inexpensive light accordions with a sound amplifying device, by means of which the volume and tone of such accordions may be amplified at will.

Other objects of the present invention will become apparent in the course of the following specifications:

In accomplishing the objects of the present invention, it was found desirable to provide two elongated microphones and to place them within the accordions close to the base and treble sides thereof. The two microphones are connected to each other by a conducting wire, the coils of which are preferably located in the folds of the accordion. One of the microphones is connected with an amplifier control unit and loud speaker, which are located outside of the accordion. The accordion may carry knobs which may be conveniently operated by the player, which are connected to the microphones for varying volume and tone.

The invention will appear more clear from the following detailed description, when taken in connection with the accompanying drawing, showing by way of example a preferred embodiment of the inventive idea.

In the drawing:

Figure 1 is a front view of an accordion provided with built-in microphones.

Figure 2 is a top view of the accordion shown in Figure 1.

Figure 3 illustrates diagrammatically the connection of the accordion with an amplifier control unit and a loud speaker.

The accordion 3 shown in the drawing is of the usual form and includes a treble side provided with the keys 1, as well as the base side having buttons 2. The casing 20 of the accordion, which is located adjacent the treble side, constitutes the fixed part of the instrument and is provided with the usual openings 21. At least one bank of reeds is mounted on each side of the instrument according to the conventional practice.

The movable part 22 of the casing which carried the buttons 2 and which constitutes the base side, is connected with the casing 20 by the usual expandible and contractible portion having the folds 23. The illustrated accordion may be of any standard make.

In accordance with the present invention, the casing 20 of the accordion contains an elongated microphone 5 which extends preferably along practically the height or length of the reed bank (not shown) of the treble side of the accordion. The microphone 5 is preferably located close to the openings 21 of the casing 20, and is so arranged that it receives substantially uniformly all the sounds produced by the reed bank (not shown) upon operation of the keys 1.

Another microphone 6 which is similar in size and shape to the microphone 5 is located within the casing 22 at the base side of the instrument.

The microphone 6, which picks up the base notes or sounds produced by operation of the accordion is so disposed that it receives substantially uniformly all the sounds produced by the base side.

The microphones 5 and 6 may be joined by a conducting wire 4, the coils of which fit in the folds 23, and which may extend when the folds 23 are extended. One end of the wire 4 is connected by a wire 7 to the microphone 5, while the other end of the wire 4 is connected by a wire 8 to the microphone 6.

The microphone 5 is connected with two knobs or control buttons 9 and 10 which are carried by the casing 20 and which may be conveniently used by the player to control the volume and the tone respectively.

The microphone 6 is connected in a similar manner with control buttons 11 and 12.

The fixed casing 20 carries a socket 24, which is connected with the microphone 5 and is adapted to receive a plug 15 shown in Figure 3. The plug 15 is connected by a conducting wire 14 with an amplifying control unit 13. This unit is located outside of the accordion and may be connected by a plug 16 with any suitable source of electrical energy. The unit 13 is connected with a loud speaker 19 and is provided with control buttons 17 and 18 for varying the volume and tone of the sounds emanating from the loud speaker 19.

In operation the sound waves produced by operation of the accordion are picked up by the microphone 5 and 6 in which they are converted into audio electrical impulses. The audio electrical impulses are in turn transmitted through the extensible electric current conducting wire 4, connection or socket 24, conducting wire 14 to the amplifying unit 13 and loud speaker 19 where the amplified electric audio impulses are reconverted to sound waves.

It is apparent that the amplifying device makes it possible to increase the sounds of a comparatively small or weakly operated instrument to any desired proportion. The described arrangement makes it possible to amplify the sound without distorting it in any way, and enables the control of its volume and tone by the player himself or by another person located close to the amplifier control unit.

It is apparent that the invention shown above has been given by way of illustration and not by way of limitation, and that the example described above is subject to wide variations and modifications without departing from the scope or intent of the present invention. All of such variations and modifications are to be included within the scope of the present invention.

What is claimed is:

1. In an accordion having at least one bank of reeds on each side, a pair of elongated microphones substantially corresponding in length to the length of the banks of reeds and mounted one in each side thereof, an extensible coiled wire electric current conductor operatively interconnecting said microphones, a volume control unit operatively connected to each of said microphones, an amplifier control unit, a loud speaker, and means connecting said microphones, amplified control unit and loud speaker in audio electric current transmitting connection.

2. In an accordion having two side sections each containing a reed bank, and a bellows connecting said sections, a pair of elongated microphones substantially corresponding in length to the length of the reed bank and mounted within each of said sections and located to pick up audio waves produced by said reed banks, an extensible coiled electric current conducting wire connecting said microphones and extending through said bellows, and an amplifier unit and a loud speaker connected in electric-audio impulse transmitting connection with said microphones.

3. In an accordion having two side sections each containing a reed bank, and a bellows connecting said sections, a pair of elongated microphones substantially corresponding in length to the length of the reed bank and located to pick up audio waves produced by said reed banks, an extensible coiled electric current conducting wire connecting said microphones and extending through said bellows, an amplifier unit and a loud speaker connected in electric-audio impulse transmitting connection with said microphones, and means carried by each of said sections and connected to the microphone carried by the section for controlling the volume and tone qualities of the electrical audio impulse transmitted by the microphones.

DOMINICK ZACCAGNINO.

REFERENCES CITED

The following references are of record in the file of this patent:

UNITED STATES PATENTS

| Number | Name | Date |
|---|---|---|
| 1,762,449 | Marks | June 10, 1930 |
| 2,001,392 | Miessner | May 14, 1935 |
| 2,093,223 | Yamashita | Sept. 14, 1937 |
| 2,138,500 | Miessner | Nov. 29, 1938 |